United States Patent
Kawai et al.

(10) Patent No.: US 12,082,594 B2
(45) Date of Patent: Sep. 10, 2024

(54) METHOD FOR PRODUCING LIQUID FERMENTED MILK

(71) Applicant: MEIJI CO., LTD., Tokyo (JP)

(72) Inventors: Yoshitaka Kawai, Tokyo (JP); Kakuhei Isawa, Tokyo (JP); Tomomi Abe, Tokyo (JP)

(73) Assignee: MEIJI CO., LTD., Tokyo (JP)

( * ) Notice: Subject to any disclaimer, the term of this patent is extended or adjusted under 35 U.S.C. 154(b) by 667 days.

(21) Appl. No.: 17/264,169

(22) PCT Filed: Jul. 30, 2019

(86) PCT No.: PCT/JP2019/029790
§ 371 (c)(1),
(2) Date: Jan. 28, 2021

(87) PCT Pub. No.: WO2020/031785
PCT Pub. Date: Feb. 13, 2020

(65) Prior Publication Data
US 2021/0282421 A1    Sep. 16, 2021

(30) Foreign Application Priority Data

Aug. 8, 2018 (JP) ................. 2018-149165

(51) Int. Cl.
*A23C 9/123* (2006.01)
*A23C 21/06* (2006.01)

(52) U.S. Cl.
CPC .............. *A23C 9/123* (2013.01); *A23C 21/06* (2013.01)

(58) Field of Classification Search
CPC ..... A23C 9/123; A23C 21/06; A23C 2210/15; A23C 9/1307
See application file for complete search history.

(56) References Cited

U.S. PATENT DOCUMENTS

2013/0266692 A1* 10/2013 Saito et al. ............ A23C 9/123
426/583
2018/0249733 A1   9/2018 Rajakari et al.

FOREIGN PATENT DOCUMENTS

| CN | 103269599 | 8/2013 |
|---|---|---|
| CN | 106538685 | 3/2017 |
| JP | 1-17656 | 3/1989 |
| JP | 7-104 | 1/1995 |
| JP | 3645986 | 2/2005 |
| JP | 3811631 | 8/2006 |
| WO | 2016/068276 | 5/2016 |
| WO | 2017/037345 | 3/2017 |
| WO | 2019/189333 | 10/2019 |

OTHER PUBLICATIONS

Uchida et al. (WO2016068276A1 English Machine Translation) (Year: 2016).*
International Search Report (ISR) issued Oct. 15, 2019 in International (PCT) Application No. PCT/JP2019/029790.
Notification issued Jan. 10, 2023 in corresponding Japanese Patent Application No. 2018-149165, with English translation.
Tadao Saito et al., "Dictionary of Yogurt", Asakura Publishing Co., Ltd., (Apr. 20, 2016) pp. 128-130.
Standard Tables of Food Composition in Japan, (2015) Seventh Version, pp. 13-14.

* cited by examiner

*Primary Examiner* — Robert A Wax
*Assistant Examiner* — Quanglong N Truong
(74) *Attorney, Agent, or Firm* — Wenderoth, Lind & Ponack, L.L.P.

(57) ABSTRACT

A method for producing liquid fermented milk according to the present invention includes: preparing a fermented milk base that contains milk protein containing whey protein; adding a lactic acid bacteria starter to the fermented milk base and then inducing fermentation to produce fermented milk curds; breaking the fermented milk curds to produce fermented milk having an average particle diameter of 1 μm or more and 20 μm or less; and holding the fermented milk in a container to thicken the fermented milk, thereby producing liquid fermented milk, the liquid fermented milk containing the milk protein in an amount of 2.5% or more, the milk protein containing the whey protein in an amount of 25% or more, the liquid fermented milk having a viscosity at 10° C. of 100 mPa·s or more and 700 mPa·s or less.

5 Claims, No Drawings

METHOD FOR PRODUCING LIQUID FERMENTED MILK

TECHNICAL FIELD

The present invention relates to a method for producing liquid fermented milk.

BACKGROUND ART

Fermented milk is classified into hard (solid) yogurt, drinking yogurt (liquid fermented milk), and stirred yogurt which is in between the formers. Examples of methods for producing fermented milk include a pre-fermentation type production method in which a fermented milk base with a lactic acid bacteria starter added thereto is fermented before filled in a container and a post-fermentation type production method in which a fermented milk base with a lactic acid bacteria starter added thereto is filled in a container, followed by fermentation.

Among them, liquid fermented milk is generally produced by a pre-fermentation type production method in which a fermented milk base with a lactic acid bacteria starter added thereto is fermented before filled in a container. In such a pre-fermentation type production method, a fermented milk base with a lactic acid bacteria starter added thereto is fermented to obtain curds in which the fermented milk is in a gel form, and the resulting curds are broken in a container to adjust the average particle diameter of liquid fermented milk.

In order to smoothen the texture of liquid fermented milk to achieve dense smooth consistency leading to good throat flow, it is effective to break curds to reduce the average particle diameter. This however leads to a problem in that the viscosity is simultaneously decreased to reduce rich body. On the other hand, if the breakage of curds is suppressed in liquid fermented milk with a high regard for the rich body, the average particle diameter is increased to cause poor throat flow (heaviness).

For solving the above problem, a technique is proposed as described in PTL 1 in which predetermined amounts of gelatin and starch are added to fermented milk to adjust the consistency and body of the liquid fermented milk.

CITATION LIST

Patent Literature

PTL 1: Japanese Patent No. 3811631

SUMMARY OF INVENTION

Technical Problem

However, a stabilizer or a thickener, such as gelatin, if added, may affect the flavor of liquid fermented milk. Thus, it is desired to develop novel liquid fermented milk having both dense smooth consistency leading to good throat flow and rich body without using any stabilizer or thickener.

Thus, the present invention has an object to provide a novel method for producing liquid fermented milk having both dense smooth consistency leading to good throat flow and rich body without using any stabilizer or thickener.

Solution to Problem

The method for producing liquid fermented milk according to the present invention includes: a preparation step of preparing a fermented milk base that contains milk protein containing whey protein; a fermentation step of adding a lactic acid bacteria starter to the fermented milk base and then inducing fermentation to produce fermented milk curds; a breakage step of breaking the fermented milk curds so that fermented milk has an average particle diameter of 1 μm or more and 20 μm or less; and a holding step of holding the broken fermented milk in a container to thicken the fermented milk, thereby producing liquid fermented milk, the liquid fermented milk containing the milk protein in an amount of 2.5% or more, the milk protein containing the whey protein in an amount of 25% or more, the liquid fermented milk having a viscosity at 10° C. of 100 mPa·s or more and 700 mPa·s or less.

Advantageous Effects of Invention

According to the method of the present invention, by incorporating a predetermined amount of whey protein in a production process and performing a breakage step and a holding step, it is possible to reduce the average particle diameter and viscosity by breakage and subsequently induce thickening, and the viscosity at 10° C. of the liquid fermented milk can be made 100 mPa·s or more and 700 mPa·s or less. Thus, liquid fermented milk having both dense smooth consistency leading to good throat flow and rich body can be obtained without using any stabilizer or thickener.

DESCRIPTION OF EMBODIMENTS

An embodiment of the present invention will be described in detail below.

<Outline of Liquid Fermented Milk Produced by Production Method of the Invention>

The liquid fermented milk produced by the production method of the present invention is a pre-fermentation type drinking (liquid) yogurt. The liquid fermented milk contains 2.5% or more of milk protein based on the entire liquid fermented milk in the final product, and the milk protein contains 25% or more of whey protein (the content is represented by "whey protein/milk protein" and hereinafter also referred to as a whey protein ratio).

The milk protein according to this embodiment includes casein protein and whey protein. Examples of casein protein include α-casein and β-casein. Examples of whey protein include α-lactalbumin, β-lactoglobulin, and serum albumin.

When the milk protein is incorporated in an amount of 2.5% or more into the liquid fermented milk as the final product, the rich body can be achieved. When the amount is 6.0% or less, the flavor can be improved. Accordingly, the liquid fermented milk preferably contains milk protein in an amount of 2.5% or more and 6.0% or less.

Milk protein is more preferably contained in an amount of 3.0% or more 4.0% or less based on the entire liquid fermented milk. When the amount of the milk protein is 3.0% or more 4.0% or less, richer body can be achieved and the flavor is further improved. Thus, both the rich body and the good flavor can be achieved.

When whey protein is incorporated in an amount of 25% or more into the milk protein in the liquid fermented milk as the final product, the hardness of the fermented milk curds (hereinafter also simply referred to as curds) can be increased. On the other hand, when the whey protein in the milk protein is 45% or less, the heat resistance can be enhanced and the flavor can be improved. Accordingly, in the fermented milk, the whey protein is preferably contained in the milk protein in an amount of 25% or more 45% or less.

A desirable amount of the whey protein in the milk protein is more preferably 35% or less. When the amount of the whey protein in the milk protein is 35% or less, the heat resistance can be further enhanced and the flavor can be improved.

The content (% by mass) of the milk protein in the liquid fermented milk and the content (% by mass) of the whey protein in the milk protein can be measured by the kjeldahl method. When the kjeldahl method is used, the nitrogen-to-protein conversion factor is set to 6.38.

It is desirable that the liquid fermented milk produced by the production method of the present invention have a viscosity at 10° C. of 100 mPa·s or more and 700 mPa·s or less. When the viscosity at 10° C. of the liquid fermented milk is 100 mPa·s or more, the body can be provided without impairing the rich texture. When the viscosity at 10° C. of the liquid fermented milk is 700 mPa·s or less, smooth liquid fermented milk having not-heavy texture upon eating with good throat flow can be provided.

A desirable viscosity at 10° C. of the liquid fermented milk is preferably 150 mPa·s or more. When the viscosity at 10° C. of the liquid fermented milk is 150 mPa·s or more, rich texture and body can further be provided.

A desirable viscosity at 10° C. of the liquid fermented milk is more preferably 180 mPa·s or more and 600 mPa·s or less. When the viscosity at 10° C. of the liquid fermented milk as the final product is 180 mPa·s or more and 600 mPa·s or less, both the body and the good throat flow can be achieved.

The viscosity of the liquid fermented milk herein is a value measured using a rotational Brookfield viscometer (for example, "TVB10 type viscometer" manufactured by Toki Sangyo Co., Ltd.) at a measurement temperature of 10° C. after a No. 4 rotor (code M23) is allowed to enter a measurement object and is rotated (60 rpm, 30 seconds).

Through breakage by the breakage step (as described later) performed in the production process, the liquid fermented milk produced by the production method of the present invention has an average particle diameter of 1 μm or more and 20 μm or less, and the viscosity at 10° C. of the final product is 100 mPa·s or more and 700 m. Pa or less. Thus, the acidity can be suppressed in the final product to provide mild feeling.

Sugar, a fruit juice, or the like may be added to the liquid fermented milk as described above. It is desirable that, even when a fruit juice or the like is added to the liquid fermented milk, the final product have the viscosity as described above.

<Method for Producing Liquid Fermented Milk of the Invention>

Liquid fermented milk produced by the production method of the present invention is a pre-fermentation type drinking yogurt and can be produced as follows. First, a fermented milk base which is raw material milk is prepared. The fermented milk base is prepared, for example, by adding a predetermined amount of whey protein to raw milk, powdered skim milk, concentrated skim milk, fresh cream, butter, milk protein concentrate, raw material water, and the like and mixing the mixture (preparation step).

The fermented milk base used in the present invention is not limited, but in terms of a solid not fat (SNF), a desirable proportion of SNF in the entire fermented milk base is preferably 6 to 12%, more preferably 8 to 10%, and in terms of fat (FAT), a desirable proportion of FAT in the entire fermented milk base is preferably 0 to 5.0%, more preferably 2.0 to 4.0%. The contents of the SNF and FAT are however not limited to the above ranges. Sugar, a fruit juice, or the like may be added to the fermented milk base.

In this case, by adjusting the contents of powdered skim milk, concentrated skim milk, fresh cream, raw milk, butter, milk protein concentrate, and the like, the content of the milk protein in the liquid fermented milk as the final product can be adjusted.

Whey protein can be incorporated by adding whey powder, whey protein concentrate (WPC), whey protein isolate (WPI), or the like to the fermented milk base. In this case, by adjusting the content of the whey protein concentrate or the like, the content of the whey protein (the proportion (%) of the whey protein in the milk protein) in the liquid fermented milk as the final product can be adjusted.

Next, the prepared fermented milk base is heat-sterilized at a temperature between about 90° C. to 120° C. for 30 seconds or more, then a lactic acid bacteria starter is added thereto, and fermentation is performed to produce curds in which the fermented milk is in a gel form. As the lactic acid bacteria starter, for example, *Lactobacillus bulgaricus, Streptococcus thermophilus*, or other lactic acid bacteria can be used. The fermentation conditions may be the same as conventional conditions, and, for example, the fermented milk base is fermented at about 40° C. for 3 to 5 hours (fermentation step).

Next, the produced curds are broken to produce fermented milk in a liquid form having an average particle diameter of 1 μm or more and 20 μm or less and a viscosity at 10° C. of 100 mPa·s or less (breakage step). When the average particle diameter of the liquid fermented milk is made 1 μm or more and 20 μm or less through breakage by the breakage step, the liquid fermented milk as the final product obtained through the subsequent holding step (as described later) achieves smooth throat flow with reduced gritty texture. The average particle diameter of the liquid fermented milk here is an average particle diameter of the liquid fermented milk obtained by breakage and is an average particle diameter of the liquid fermented milk measured immediately after completing the breakage of the curds (immediately after breakage).

A desirable average particle diameter of the liquid fermented milk immediately after breakage is more preferably 1 μm or more and 15 μm or less. When the average particle diameter of the liquid fermented milk immediately after breakage is 1 μm or more and 15 μm or less, gritty texture can be further reduced to achieve smoother throat flow in the final product. A desirable average particle diameter of the liquid fermented milk immediately after breakage is most preferably 10 μm or less. When the average particle diameter is 10 μm or less, gritty texture can be further securely suppressed to achieve smooth throat flow in the final product.

The average particle diameter of the liquid fermented milk immediately after breakage can be measured using a laser diffraction particle size distribution analyzer SALD-2200 (manufactured by Shimadzu Corporation). Specifically, liquid fermented milk obtained immediately after breakage is diluted with ion exchange water to adjust the maximum value in the optical intensity distribution of diffracted and scattered light into 35 to 75% (absolute value: 700 to 1500). Then, the optical intensity distribution is analyzed using a software for particle size analyzer, Wing SALD II, to determine the particle size distribution of the particles in the liquid fermented milk immediately after breakage, thereby identifying the average particle diameter.

The viscosity of the liquid fermented milk immediately after breakage is measured using a rotational Brookfield viscometer (for example, "TVB 10 type viscometer" manufactured by Toki Sangyo Co., Ltd.) at a measurement temperature of 10° C. after a No. 4 rotor (code M23) is allowed to enter a measurement object and is rotated (60 rpm, 30 seconds).

It is desirable that the curds be broken using, for example, a homogenizer. It is desirable in the breakage with a homogenizer that curds be homogenized at a pressure of 1 MPa or more and 20 MPa or less. When curds are homogenized at 1 MPa or more, smooth texture upon eating with reduced gritty texture can be achieved. With a pressure of 20 MPa or less, excessive damage applied on the curds can be suppressed.

In such a breakage step, by adjusting the pressure and breakage time on breakage with a homogenizer, the average particle diameter of the liquid fermented milk immediately after breaking the fermented milk curds can be adjusted to 1 μm or more and 20 μm or less, or 1 μm or more and 15 μm or less, for example.

In the case of this embodiment, by breaking curds with high breakage power using a homogenizer, the average particle diameter of the curds can be further reduced as compared with the case of breakage using a filter, while the viscosity at 10° C. can be 100 mPa·s or less. Thus, the texture of the liquid fermented milk as the final product can be dense and smooth.

Then, the broken fermented milk is filled in a container, and is then held at 20° C. or higher and 50° C. or lower for 1 hour or more, or at 0.5° C. or higher and lower than 20° C. for 2 hours or more (holding step), whereby the liquid fermented milk as the final product can be produced. As the container in which the broken fermented milk is filled, a tank, a box-shaped container, or other various containers can be applied. When fermented milk enriched with whey protein is held under the above conditions, the surface hydrophobicity of casein micelle is increased due to thermal denaturation induced and the distance between particles can be reduced after breakage of curds to increase the effect of developing hydrophobic interaction among the milk protein molecules (thickening).

In this manner, in the production method according to the present invention, curds are broken and homogenized and then the resultant is held under a predetermined condition, whereby thickening can be induced. Accordingly, even after curds are finely broken to reduce the average particle diameter and to make the viscosity at 10° C. 100 mPa·s or less, thickening by the holding step can make the viscosity at 10° C. 100 mPa·s or more and 700 mPa·s or less to thereby produce rich liquid fermented milk with body.

The viscosity at 10° C. of the liquid fermented milk produced by the holding step can be made a desired value by adjusting the content of milk protein contained in the fermented milk base, the whey protein ratio, the viscosity of fermented milk in the breakage step, or the holding time and holding temperature in the holding step, for example.

It is desirable here that the viscosity at 10° C. of the liquid fermented milk produced by holding the broken fermented milk be increased (the liquid fermented milk is thickened) by 50 mPa·s or more from the viscosity at 10° C. of the fermented milk after breakage by the breakage step. When the viscosity of the liquid fermented milk produced by the holding step is increased by 50 mPa·s or more from the viscosity of the fermented milk after breakage by the breakage step, water separation can be suppressed and the body can be provided without impairing the rich texture.

In the holding step, the broken fermented milk is not necessarily required to be held in the stationary state continuously, and the state of holding may be maintained while transporting the broken fermented milk in the state filled in a container.

In the production method according to this embodiment, the process proceeds to the holding step after breaking curds as described above. However, due to the enriched whey protein, after broken by the breakage step, not only thickening occurs but also particles is possibly bonded to each other in the liquid fermented milk to further increase the diameter. Accordingly, it is desirable that the average particle diameter of the liquid fermented milk within 24 hours from the beginning of the holding of the fermented milk (liquid fermented milk) by the holding step be 1 μm or more and 20 μm or less. When the average particle diameter of the liquid fermented milk while or after the liquid fermented milk is thickened by the holding step is 1 μm or more and 20 μm or less, gritty texture in the final product can be securely suppressed to achieve smooth throat flow.

The "beginning of the holding" means, for example, (i) the time when a container filled with the broken fermented milk begins to be held at a temperature of 20° C. or higher and 50° C. or lower in the case of a holding step of holding at 20° C. or higher and 50° C. or lower for 1 hour or more, or (ii) the time when a container filled with the broken fermented milk begins to be held at a temperature of 0.5° C. or higher and lower than 20° C. in the case of a holding step of holding at 0.5° C. or higher and lower than 20° C. for 2 hours or more.

A desirable average particle diameter of the liquid fermented milk within 24 hours from the beginning of the holding of the fermented milk (liquid fermented milk) by the holding step is more preferably 15 μm or less. When the average particle diameter of the liquid fermented milk while or after the liquid fermented milk is thickened by the holding step is 15 μm or less, gritty texture in the final product can be further securely suppressed to achieve smooth throat flow.

Action and Effect

In the above configuration, in the production method according to the present invention, curds obtained by fermenting a fermented milk base that contains 2.5% or more milk protein, the milk protein containing 25% or more of whey protein, were homogenized with a homogenizer (breakage step). The average particle diameter of the fermented milk immediately after breakage is thus made 1 μm or more and 20 μm or less. Then, the broken fermented milk was held at 20° C. or higher and 50° C. or lower for 1 hour or more or at 0.5° C. or higher and lower than 20° C. for 2 hours or more.

Accordingly, in this production method, thickening is induced by the holding step after homogenization, and thus liquid fermented milk containing 2.5% or more of milk protein, the milk protein containing 25% or more of whey protein, the fermented milk having a viscosity at 10° C. of 100 mPa·s or more and 700 mPa·s or less, can be produced. Consequently, in the present invention, by reducing the average particle diameter and the viscosity by breakage and subsequently inducing thickening, liquid fermented milk having both the dense smooth consistency leading to good throat flow and the rich body can be provided without using any stabilizer or thickener.

EXAMPLES

The present invention will be specifically described below with reference to examples, but the present invention is not to be limited to the examples.

Example 1

In Example 1, 25 g of fresh cream, 230 g of concentrated skim milk, 4 g of whey protein extract (WPI), 55 g of sugar, and 656 g of raw material water were mixed to prepare a fermented milk base (SNF 8.2%, fat 1.3%).

Next, the prepared fermented milk base was sterilized at 110° C. for 30 seconds, and then 30 g of a lactic acid bacteria starter which was obtained by culturing lactic acid bacteria isolated from Meiji Bulgaria Yogurt LB81 in a 10% powdered skim milk medium was added thereto and fermentation was performed at 43° C. for 3 to 5 hours until the pH reached 4.4.

The resulting fermented milk curds were broken and homogenized using a homogenizer (manufactured by Izumi Food Machinery, Co., Ltd.) at a flow rate of 135 L/h and a pressure of 15 MPa. Then, the broken fermented milk was filled in a container and was held at 10° C. for 10 days to thicken the fermented milk, thereby producing liquid fermented milk of Example 1.

Example 2

In Example 2, the whey protein ratio was changed from that in Example 1 described above. Specifically, in Example 2, 570 g of raw milk, 17 g of powdered skim milk, 6 g of whey protein extract (WPI), 35 g of whey powder, and 342 g of raw material water were mixed to prepare a fermented milk base (SNF 8.2%, fat 2.0%).

Next, the prepared fermented milk base was sterilized at 110° C. for 30 seconds, and then 30 g of a lactic acid bacteria starter was added thereto and fermentation was performed at 43° C. for 3 to 5 hours until the pH reached 4.4.

The resulting fermented milk curds were broken and homogenized using the same homogenizer as above at a flow rate of 135 L/h and a pressure of 15 MPa. Then, the broken fermented milk was filled in a container and was held at 10° C. for 10 days to thicken the fermented milk, thereby producing liquid fermented milk of Example 2.

Comparative Example 1

In Comparative Example 1, the method of breakage was changed from that in Example 1 and Example 2 described above to use a filter. Specifically, 560 g of raw milk, 6 g of powdered skim milk, 16 g of whey protein concentrate (WPC), 35 g of whey powder, and 353 g of raw material water were mixed to prepare a fermented milk base (SNF 8.2%, fat 2.0%).

Next, the prepared fermented milk base was sterilized at 95° C. for 120 seconds, and then 30 g of a lactic acid bacteria starter was added thereto and fermentation was performed at 43° C. for 3 to 5 hours until the pH reached 4.4.

Then, the resulting fermented milk curds were broken using a 60 mesh filter. Subsequently, the fermented milk after passing through the filter was held in a container at 10° C. for 10 days to thicken the fermented milk, thereby producing liquid fermented milk of Comparative Example 1.

Comparative Example 2

In Comparative Example 2, a fermented milk base having a whey protein ratio less than 25% was provided. Specifically, 580 g of raw milk, 120 g of concentrated skim milk, and 270 g of raw material water were mixed to prepare a fermented milk base (SNF 8.2%, fat 2.0%).

Next, the prepared fermented milk base was sterilized at 95° C. for 120 seconds, then 30 g of a lactic acid bacteria starter was added thereto, and fermentation was performed at 43° C. for 3 to 5 hours until the pH reached 4.4.

Then, the resulting fermented milk curds were broken and homogenized using the same homogenizer as above at a flow rate of 135 L/h and a pressure of 15 MPa. Then, the broken fermented milk was filled in a container and was held at 10° F. or 10 days to thicken the fermented milk, thereby producing liquid fermented milk of Comparative Example 2.

<Contents of Milk Protein and Whey Protein>

For each liquid fermented milk obtained in Examples 1, 2 and Comparative Examples 1, 2, the proportion (%) of milk protein in the entire liquid fermented milk (shown as "Milk protein" in Table 1), the proportion (%) of whey protein in the entire liquid fermented milk (shown as "Whey protein" in Table 1), and the proportion (%) of whey protein in the entire milk protein (shown as "Whey protein/milk protein" in Table 1) were determined by the kjeldahl method to thus obtain the results shown in Table 1. When the kjeldahl method was used, the nitrogen-to-protein conversion factor was set to 6.38.

<Average Particle Diameter>

Next, for Examples 1, 2 and Comparative Examples 1, 2 described above, the average particle diameter immediately after breakage was measured. The average particle diameter of liquid fermented milk here was measured using a laser diffraction particle size distribution analyzer SALD-2200 (manufactured by Shimadzu Corporation). Specifically, the liquid fermented milk was diluted with ion exchange water to adjust the maximum value in the optical intensity distribution of diffracted and scattered light into 35 to 75% (absolute value: 700 to 1500). Then, the optical intensity distribution was analyzed using a software for particle size analyzer, Wing SALD II, to determine the particle size distribution of the particles in the liquid fermented milk, thereby identifying the average particle diameter. Thus, the results as shown in Table 1 were obtained.

TABLE 1

| | Example 1 | Example 2 | Comparative Example 1 | Comparative Example 2 |
|---|---|---|---|---|
| SNF | 8.2% | 8.2% | 8.2% | 8.2% |
| Fat | 1.3% | 2.0% | 2.0% | 2.0% |
| Milk protein | 3.4% | 3.4% | 3.1% | 3.1% |
| Whey protein | 1.1% | 1.4% | 1.5% | 0.6% |
| Whey protein/milk protein | 32.4% | 41.2% | 48.4% | 20.0% |
| pH after completion of fermentation | 4.4 | 4.4 | 4.4 | 4.4 |
| Breakage of curds | Homogenizer (15 MPa) Flow rate (135 L/h) | Homogenizer (15 MPa) Flow rate (135 L/h) | Filter (60 mesh) | Homogenizer (15 MPa) Flow rate (135 L/h) |
| Viscosity (10° C.) immediately after breakage | 56 mPa · s | 45 mPa · s | 243 mPa · s | 13 mPa · s |
| Viscosity (10° C.) after held for 10 days | 234 mPa · s | 598 mPa · s | 792 mPa · s | 55 mPa · s |
| Average particle diameter immediately after breakage | 4.1 μm | 6.8 μm | 11.9 μm | 4.1 μm |
| Texture upon | Good | Good | Heavy and | Thin and |

TABLE 1-continued

|  | Example 1 | Example 2 | Comparative Example 1 | Comparative Example 2 |
| --- | --- | --- | --- | --- |
| eating | (smooth and rich, and clear throat flow) | (smooth and rich, and clear throat flow) | poor throat flow | watery |
| Acidity | Mild acidity | Mild acidity | Slightly mild acidity | Very strong acidity |

As shown in Table 1, in Comparative Example 1 in which a filter was used for breakage, the average particle diameter of the liquid fermented milk immediately after breakage was 11.9 μm which was more than 10 μm. On the other hand, in Examples 1 and 2 and Comparative Example 2 in which a homogenizer was used for breakage, the average particle diameter of the liquid fermented milk immediately after breakage was 10 μm or less and it was confirmed that finer particles were obtained than in the case of using a filter.

Examples 1, 2 and Comparative Examples 1, 2 in which the average particle diameter immediately after breakage was 20 μm or less are provided here. In another verification test, when the average particle diameter in the liquid fermented milk immediately after breakage was more than 20 μm, a sensory evaluation showed that liquid fermented milk as a final product obtained through the holding step had significant gritty texture and smooth texture upon eating could not be achieved with poor throat flow.

<Viscosity>

Next, the viscosity was measured for Examples 1, 2 and Comparative Examples 1, 2 and thus the results shown in Table 1 were obtained. In this description, the viscosities of liquid fermented milk are values measured using a rotational Brookfield viscometer (for example, "TVB 10 type viscometer" manufactured by Toki Sangyo Co., Ltd.) at a measurement temperature of 10° C. after a No. 4 rotor (code M23) is allowed to enter a measurement object and is rotated (60 rpm, 30 seconds).

As shown in Table 1, in Examples 1, 2 and Comparative Example 2 in which a homogenizer was used for breakage, the viscosities immediately after breaking curds were 100 mPa·s or less, but in Comparative Example 1 in which a filter was used for breakage, the viscosity immediately after breaking curds was more than 100 mPa·s. In addition, in Examples 1 and 2 in which the viscosity immediately after breaking curds was 100 mPa·s or less and the proportion of whey protein in the entire milk protein was 25% or more, the liquid fermented milk was thickened through the holding step and the viscosity was made 100 mPa·s or more and 700 mPa·s or less.

On the other hand, even when the viscosity immediately after breaking curds was 100 mPa·s or less, in Comparative Example 2 in which the proportion of whey protein in the entire milk protein was less than 25%, the liquid fermented milk had a viscosity that was increased but was less than 100 mPa·s after the holding step. It was confirmed from the results that, when the proportion of whey protein in the entire milk protein was less than 25%, curds were difficult to thicken after homogenizing the curds using a homogenizer to result in a viscosity at 10° C. less than 100 mPa·s, and the resulting liquid fermented milk did not have body.

It was confirmed from the above results that, when the proportion of whey protein in the entire milk protein was 25% or more, even if the viscosity was made 100 mPa·s or less using a homogenizer, the broken fermented milk could be thickened to achieve a viscosity at 10° C. of 100 mPa·s or more and 700 mPa·s or less.

<Sensory Evaluation Test>

Next, for each liquid fermented milk of Examples 1, 2 and Comparative Examples 1, 2 described above, a sensory evaluation test by 10 panelists was performed to evaluate the texture upon eating. In this sensory evaluation test, 70 g of each liquid fermented milk of Examples 1, 2 and Comparative Examples 1, 2 was eaten and the texture upon eating on the tip of tongue and in the mouth was evaluated. The results are shown as "Texture upon eating" in Table 1.

As shown in Table 1, for the liquid fermented milk of Comparative Example 1 in which the average particle diameter immediately after breakage was 11.9 μm and the viscosity at 10° C. was as high as 792 mPa·s, although gritty texture was low due to the average particle diameter immediately after breakage of 20 μm or less, the texture upon eating was sticky due to the viscosity at 10° C. at a high level more than 700 mPa·s and the fermented milk was felt too heavy as liquid fermented milk.

On the other hand, in Comparative Example 2 in which a homogenizer was used for breaking curds to apply a high power of breakage on curds, the average particle diameter immediately after breakage was as small as 20 μm or less, although gritty texture was not felt in the texture upon eating, the texture upon eating was too smooth without body due to the viscosity at 10° C. after the holding step of less than 100 mPa·s.

In contrast, in the liquid fermented milk of Example 1 in which the average particle diameter immediately after breakage was 1 μm or more and 20 μm or less (more specifically 10 μm or less) and the viscosity at 10° C. after the holding step was in the range of 100 mPa·s or more and 700 mPa·s or less, the average particle diameter was small, and smooth texture upon eating with no gritty texture and with good clear throat flow was achieved. Furthermore, while achieving the smooth texture upon eating with good throat flow, the viscosity was moderate and rich body was also achieved.

Also, in the liquid fermented milk of Example 2 in which the average particle diameter immediately after breakage was 6.8 μm which was 10 μm or less and the viscosity at 10° C. after the holding step was 700 mPa·s, smooth texture upon eating with reduced gritty texture and with good throat flow was achieved and rich body was also provided.

In Examples 1 and 2, curds were broken using a homogenizer at a high breakage power, but due to the whey protein incorporated, thickening occurred in the holding step after breakage and thus thickening could be induced. As a result, in the liquid fermented milk, both the dense smooth consistency leading to good throat flow and the rich body could be achieved.

It was confirmed from the above results that, by adding whey protein and breaking curds with a high breakage power, liquid fermented milk having both dense smooth consistency leading to good throat flow and rich body can be provided even without using any stabilizer or thickener.

Next, for each liquid fermented milk of Examples 1, 2 and Comparative Examples 1, 2 described above, a sensory evaluation test by 10 panelists was performed to evaluate the acidity. In this sensory evaluation test, 70 g of each liquid fermented milk of Examples 1, 2 and Comparative Examples 1, 2 was eaten and the acidity felt by the panelists was evaluated. The results are shown as "Acidity" in Table 1.

For Examples 1 and 2 in which the average particle diameter was made 1 μm or more and 20 μm or less by breakage in the breakage step and the viscosity at 10° C. was made 100 mPa·s or more and 700 mPa·s or less by the holding step, an evaluation result that the acidity was felt milder owing to the clear throat flow due to the viscosity and fine texture was provided.

For Comparative Example 1 in which the average particle diameter was 1 μm or more and 20 μm or less but the viscosity at 10° C. was more than 700 mPa·s, an evaluation result that such a mild acidity as in Examples 1 and 2 was not felt and the acidity was felt slightly mild was provided. On the other hand, for Comparative Example 2 in which the average particle diameter was 1 μm or more and 20 μm or less but the viscosity at 10° C. was less than 100 mPa·s, an evaluation result that very strong acidity was felt was provided.

It was confirmed from the above results that, by making the average particle diameter 1 μm or more and 20 μm or less by breakage by the breakage step and making the viscosity at 10° C. 100 mPa·s or more and 700 mPa·s or less by the holding step, an effect of masking acidity was obtained in the liquid fermented milk.

The invention claimed is:

1. A method for producing liquid fermented milk, the method comprising:
   preparing a fermented milk base that contains milk protein containing whey protein;
   adding a lactic acid bacteria starter to the fermented milk base and then inducing fermentation to produce fermented milk curds;
   breaking the fermented milk curds to produce fermented milk having an average particle diameter of 1 μm or more and 20 μm or less; and
   holding the fermented milk in a container to thicken the fermented milk, thereby producing liquid fermented milk,
   the liquid fermented milk containing the milk protein in an amount of 2.5% or more, the milk protein containing the whey protein in an amount of 25% or more, the liquid fermented milk having a viscosity at 10° C. of 100 mPa·s or more and 700 mPa·s or less.

2. The method for producing liquid fermented milk according to claim 1, wherein
   the fermented milk has a viscosity at 10° C. of 100 mPa·s or less,
   the liquid fermented milk has a viscosity at 10° C. increased by 50 mPa·s or more from the viscosity at 10° C. of the fermented milk.

3. The method for producing liquid fermented milk according to claim 1, wherein the fermented milk curds are homogenized at a pressure of 1 MPa or more and 20 MPa or less.

4. The method for producing liquid fermented milk according to claim 1, wherein the fermented milk is held in the container at 20° C. or higher and 50° C. or lower for 1 hour or more, or at 0.5° C. or higher and lower than 20° C. for 2 hours or more.

5. The method for producing liquid fermented milk according to claim 1, wherein the liquid fermented milk within 24 hours from the beginning of holding has an average particle diameter of 1 μm or more and 20 μm or less.

* * * * *